Patented June 6, 1944

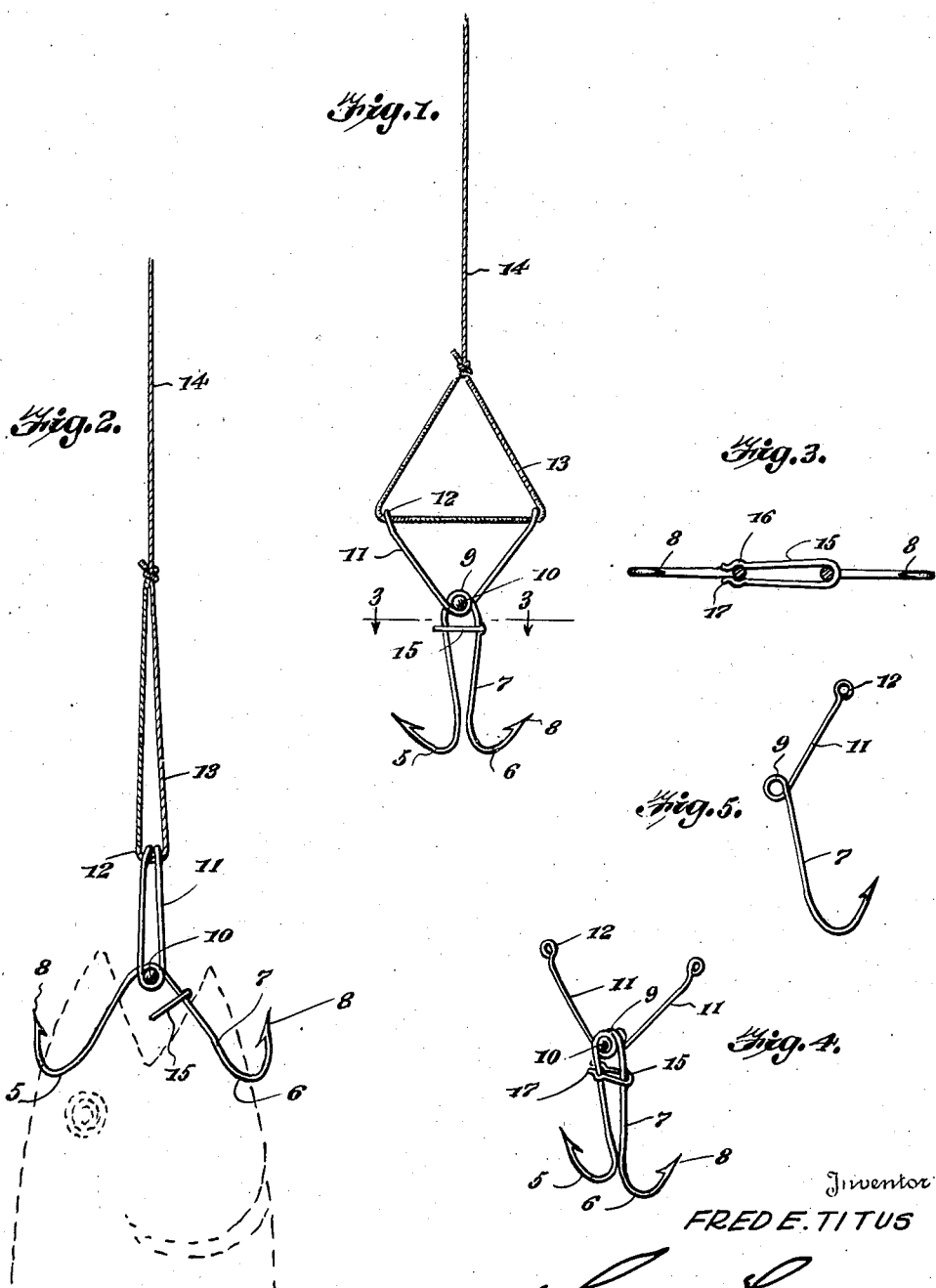

2,350,650

UNITED STATES PATENT OFFICE 2,350,650

FISHHOOK

Fred E. Titus, Durango, Colo.

Application April 20, 1943, Serial No. 483,769

3 Claims. (Cl. 43—37)

This invention relates to fish hooks and has for its object to provide a fish hook the construction of which is such that when a fish takes the bait and a longitudinal pull is exerted on the line, the barbs of the hook will pierce the upper and lower jaws of the fish and thereby effectually prevent the fish from disgorging the hook until safely landed.

A further object of the invention is to provide a relatively simple and thoroughly efficient device of the character described including coacting pivotally united hooks having outwardly extended barbs and provided with diverging actuating arms for attachment to a fishing line.

A further object is to provide a spring latch of novel construction for normally holding the barbs of the hooks in retracted position when casting or when fishing, said latch being movable to released position by longitudinal pull on the line to permit spreading or separation of said barbs to impale the jaws of a fish.

A still further object of the invention is generally to improve this class of devices so as to increase their utility, durability, and efficiency, as well as to reduce the cost of manufacture.

In the accompanying drawing:

Figure 1 is a side elevation of a fish hook embodying the present invention and showing the barbs in retracted position.

Figure 2 is a similar view showing how the barbs of the hooks impale the upper and lower jaws of a fish when the fish takes the bait and a longitudinal pull is exerted on the fishing line.

Figure 3 is a transverse sectional view taken on the line 3—3 of Figure 1.

Figure 4 is a perspective view of the fish hook.

Figure 5 is a perspective view of one of the hooks detached.

The improved fishing device forming the subject matter of the present invention comprises companion hooks 5 and 6, each including a shank 7, the lower end of which is fashioned to form a barb 8 and its intermediate portion coiled to form an eye 9 which registers with a corresponding eye on the shank of the mating hook to permit the insertion of a pivot pin 10, whereby to permit the hooks to be swung laterally, as will be more fully explained hereinafter.

The shank of each hook, after the eye 9 is formed, is extended upwardly to form a diverging actuating arm 11 provided with a terminal loop 12 which receives the adjacent loop portion 13 of a fishing line 14.

Rigidly secured to the shank 7 of one of the hooks, by solder, welding or otherwise, is a substantially U-shaped spring latch 15, the free ends of the arms of which are formed with notches or depressions 16 adapted to yieldably engage the shank of the mating hook, whereby to hold the lower ends of the hooks together with the barbs 8 thereof turned outwardly.

When fishing or casting, the lower ends of the hooks 5 and 6 are detachably held together by means of the latch 15, the outer ends of the arms of which are deflected laterally, as indicated at 17, so as to permit the free ends of the arms of the latch to readily engage the shank of the adjacent hook and thus hold the hooks in position to permit the placement of any suitable bait on the barbs of the hooks. Should a fish attempt to take the bait, a longitudinal pull exerted on the fishing line will draw the diverging actuating arms 11 together and thereby cause the barbs of the hooks to swing laterally in opposite directions and pierce the upper and lower jaws of the fish, so as to thoroughly impale the fish and prevent escape thereof until the fish is landed. Inasmuch as the hooks pierce both the upper and lower jaws of the fish, liability of the fish dislodging the hooks, or tearing the hooks out of its jaws in an effort to escape, is reduced to a minimum. After the fish has been caught, the hooks are removed and swung laterally to closed position and in which position the shank of one of the hooks will be guided by the deflected portions 17 into the adjacent notches so as to hold the hooks in proper position for again baiting the same.

Inasmuch as the latch is permanently secured to the shank of one of the hooks, it is always in position to engage the shank of the companion hook when said hooks are swung inwardly together, and, as the actuating arms 11 diverge upwardly, ample leverage is provided for moving the barbs of the hooks outwardly within the mouth of the fish when a longitudinal pull is exerted on the line in the act of fishing.

It will, of course, be understood that the fish hooks may be made in different sizes and shapes and coated or plated to protect them from the corrosive action of water.

Having thus described the invention, what is claimed is:

1. A device of the class described comprising pivotally united hooks each including a shank having its lower end provided with an outturned barb and its upper end formed with an actuating arm extending upwardly at an outward incline and adapted for attachment to a fishing line, and a horizontally disposed substantially U-shaped spring latch straddling the shank of one of the hooks transversely thereof with its bridge portion secured thereto and its arms extending from the inner side thereof, free end portions of the arms of the latch being bent to form jaws and terminals lips for guiding the jaws into position for gripping the shank of the mating hook for holding the barbs of the hooks together, said latch being movable to released position to permit separation of the barbs when a longitudinal pull is exerted on the line.

2. A device of the class described comprising pivotally united hooks each including a shank having its lower end provided with an outturned barb and its intermediate portion formed with a pivot eye adapted to register with the eye of the mating shank and thence extended upwardly to form an actuating arm for attachment to a fishing line, a pivot pin extending through said eyes, and a substantially U-shaped horizontally disposed spring latch rigidly secured to the shank of one of the hooks and provided with resilient arms having notches formed therein adapted to receive the shank of the mating hook for normally holding the barbs of said hooks together, said latch being movable to released position to permit separation of the barbs when a longitudinal pull is exerted on the line.

3. A device of the class described comprising pivotally united hooks each including a shank having its lower end provided with an outturned barb and its intermediate portion formed with a pivot eye terminating in an upwardly inclined actuating arm formed with a loop, a pin extending through said eyes, a fishing line having a substantially triangular-shaped loop extending through the eyes of the actuating arms, and a horizontally disposed substantially U-shaped spring latch secured to the shank of one of the hooks and provided with resilient arms the inner faces of which are formed with notches adapted to yieldably receive the shank of the adjacent hook, the terminals of said arms being deflected laterally to facilitate insertion of the shank within the notches, said latch being movable to released position to permit separation of the barbs when a longitudinal pull is exerted on the line.

FRED E. TITUS.